(12) United States Patent
Okuno

(10) Patent No.: US 7,780,508 B2
(45) Date of Patent: Aug. 24, 2010

(54) AIR OUTLET DEVICE FOR VEHICLE CABIN

(75) Inventor: Katsuaki Okuno, Toyoake (JP)

(73) Assignee: Howa Plastics Co., Ltd., Toyota (JP)

( * ) Notice: Subject to any disclaimer, the term of this patent is extended or adjusted under 35 U.S.C. 154(b) by 222 days.

(21) Appl. No.: 11/871,455

(22) Filed: Oct. 12, 2007

(65) Prior Publication Data

US 2008/0119124 A1 May 22, 2008

(30) Foreign Application Priority Data

Nov. 20, 2006 (JP) ............................. 2006-312467

(51) Int. Cl.
*B60H 1/34* (2006.01)
(52) U.S. Cl. ...................... 454/155; 454/315; 454/109
(58) Field of Classification Search .................. 454/69, 454/155, 315
See application file for complete search history.

(56) References Cited

U.S. PATENT DOCUMENTS 4,796,518 A * 1/1989 Murray ........................ 454/155
5,388,252 A * 2/1995 Dreste et al. ................... 714/46

FOREIGN PATENT DOCUMENTS

JP 04-069542 B2 11/1992
JP 3329670 B2 7/2002

* cited by examiner

*Primary Examiner*—Steve McAllister
*Assistant Examiner*—Helena Kosanovic
(74) *Attorney, Agent, or Firm*—Burr & Brown

(57) ABSTRACT

A register includes an operation knob which is slidably assembled to a selected one of front horizontal blades and which is connected to a selected one of rear vertical blades via a connection mechanism. The connection mechanism includes a connection pillar portion formed integrally with an intermediate portion of the selected vertical blade, the connection pillar portion having a generally circular cross section and being located at a position deviating from a rotation axis of the selected rear vertical blade, and a pair of connection arm portions extending rearward from the rear end of the operation knob with a predetermined space formed therebetween. The operation knob is connected to the selected vertical blade in a state where the connection pillar portion is rotatably inserted into an engagement groove between the connection arm portions.

1 Claim, 8 Drawing Sheets

AIR OUTLET DEVICE FOR VEHICLE CABIN

BACKGROUND OF THE INVENTION

1. Field of the Invention

The present invention relates to an air outlet device for a vehicle cabin (hereinafter referred to as "vehicle-cabin air outlet device"), such as a center register, a side register, a lower register, or a side defroster.

2. Description of the Related Art

Conventionally, there exists a vehicle-cabin air outlet device of a type which includes a rectangular tubular body which forms an air guide passage; a plurality of front-side parallel wind-direction adjustment plates rotatably supported inside the tubular body at a front end thereof; a plurality of rear-side parallel wind-direction adjustment plates which are perpendicular to the front-side wind-direction adjustment plates and rotatably supported inside the tubular body at a position shifted rearward from the front end by a predetermined distance; and an operation knob which is assembled to a selected one of the front-side wind-direction adjustment plates to be slidable along a longitudinal direction thereof. The operation knob is operatively connected to a selected one of the rear-side wind-direction adjustment plates via a connection mechanism. When the operation knob is slid on the selected front-side wind-direction adjustment plate along the longitudinal direction, the rear-side wind-direction adjustment plates are swung in a mutually interlocked manner.

The tubular body, the front-side wind-direction adjustment plates, and the rear-side wind-direction adjustment plates of a vehicle-cabin air outlet device of such a type are resin molded products formed from a synthetic resin material. In general, these constituent members are separately molded, and the vehicle-cabin air outlet device is assembled through an assembling operation of mounting the front-side and rear-side wind-direction adjustment plates to the tubular body one after another. Therefore, because of a larger number of parts, the assembly of the vehicle-cabin air outlet device requires a large number of assembly steps, which makes the assembly work troublesome.

Recently, in order to cope with the above-described drawback, there has been proposed a molding method. In this method, the rear-side wind-direction adjustment plates or the front-side wind-direction adjustment plates are molded as a group. Also, in this method, a connection rod for connecting the rear-side wind-direction adjustment plates or the front-side wind-direction adjustment plates each other and/or a support plate for rotatably supporting the rear-side wind-direction adjustment plates or the front-side wind-direction adjustment plates is molded with the group within the same molding die, and the molded rear-side wind-direction adjustment plates or front-side wind-direction adjustment plates are assembled to the connection rod and/or the support plate (see Japanese Patent Publication (kokoku) No. H4-69542). This molding method has already being put into practical use, and there has been proposed a vehicle-cabin air outlet device which is referred to as a "register" and which is configured by making use of the above-mentioned molding method (see Japanese Patent No. 3329670). In the method of manufacturing the register proposed in the latter Japanese Patent, a plurality of vertical blades, which correspond to the rear-side wind-direction adjustment plates, and a retainer, which corresponds to the tubular body, are molded in the same molding die, and the vertical blades are assembled into the retainer within the molding die.

Incidentally, in an air outlet device of such a type, an operation knob, which is assembled to a selected one of front-side wind-direction adjustment plates to be slidable along a longitudinal direction thereof, is operatively connected to a selected one of rear-side wind-direction adjustment plates via a connection mechanism; and when the operation knob is slid on the selected front-side wind-direction adjustment plate along the longitudinal direction, the rear-side wind-direction adjustment plates are swung in a mutually interlocked manner. The complex structure of the connection mechanism may possibly hinder performance of the above-described molding method, and the structure of the connection mechanism may possibly influence the operability of the operation knob. The latter Japanese Patent proposes a connection mechanism which can cope with these problems.

In the register proposed in the Japanese Patent, the connection mechanism is composed of a first connection mechanism portion provided on a selected one of the rear-side wind-direction adjustment plates, and a second connection mechanism portion provided on the operation knob side. FIGS. 6 and 7 show the connection mechanism of the register, and FIG. 8A schematically shows a state where all the vertical blades are molded within the same molding die.

The register, which is denoted by reference numeral 10, includes a retainer 10a, which is a rectangular tubular body for forming an air guide passage; a horizontal blade group 10b composed of a plurality of horizontal blades which are arranged in parallel in the vertical direction and rotatably supported inside the retainer 10a at a position near a front end opening thereof; a vertical blade group 10c composed of a plurality of vertical blades which are arranged in parallel in the horizontal direction and are rotatably supported inside the retainer 10a at a position shifted rearward from the horizontal blade group 10b by a predetermined distance; and a connection mechanism 10d for operationally connecting an operation knob to the vertical blades. These constituent members are formed of a synthetic resin material.

The vertical blade group 10c, a connection rod 13e (which will be described later) for connecting the vertical blades of the vertical blade group 10c together, and a support plate 13f (which will be described later) for rotatably supporting the vertical blades are molded in a molding die 10e schematically shown in FIG. 8A. The molding die 10e is configured to enable the vertical blades of the molded vertical blade group 10c to be assembled to the connection rod 13e and the support plate 13f within the molding die 10e. Notably, in FIG. 8A, reference numeral 10e1 denotes a stationary die half, reference numeral 10e2 denotes a movable die half, and reference character PL denotes a parting line at which the movable die half 10e2 can be separated from the stationary die half 10e1.

In the register 10, as shown in FIGS. 6 and 7, an operation knob 12 is assembled to a selected horizontal blade 11 located at a central portion in the horizontal blade group 10b. The operation knob 12 is assembled to the horizontal blade 11 to be slidable in the horizontal direction (the longitudinal direction). The connection mechanism 10d is formed between the operation knob 12 and a selected vertical blade 13 located at a central portion in the vertical blade group 10c. The connection mechanism 10d is composed of a first connection mechanism portion 10d1 provided on the vertical blade 13 and a second connection mechanism portion 10d2 provided on the operation knob 12 side.

The first connection mechanism portion 10d1 includes upper and lower flat support plate portions 13a and 13b integrally formed at a front-side intermediate portion of the vertical blade 13, and left and right connection pillar portions 13c and 13d having an elliptical cross section and integrally formed at front portions of these support plate portions 13a and 13b such that the connection pillar portions 13c and 13d are biased leftward and rightward, respectively. A front-side wall portion of the vertical blade 13 between the support plate portions 13a and 13b is formed to have a rearward concaved arcuate cutout. Such a structure of the first connection mechanism portion 10d1 enables the movable die half 10e2 to be separated from the stationary die half 10e1 at the parting line PL, serving as a reference line. The vertical blade group 10c provided with the first connection mechanism portion 10d1 is assembled to the connection rod 13e and the support plate 13f so as to form an assembly structure, which is assembled into the retainer 10a.

Meanwhile, the second connection mechanism portion 10d2 is formed integrally with a rear portion of the operation knob 12, which is assembled to the horizontal blade 11 to be slidable in the horizontal direction. The second connection mechanism portion 10d2 includes left and right outside connection arm portions 12a and 12b projecting rearward with a predetermined horizontal space formed therebetween, and a center connection arm portion 12c located between the connection arm portions 12a and 12b and dividing the space between the connection arm portions 12a and 12b into left and right engagement grooves 12a1 and 12b1. The center connection arm portion 12c is slightly shorter than the connection arm portions 12a and 12b, and its projection end portion is formed into a conical shape.

The first connection mechanism portion 10d1 is operationally connected to the second connection mechanism portion 10d2 in a state where the connection pillar portions 13c and 13d are inserted into the corresponding engagement grooves 12a1 and 12b1 of the second connection mechanism portion 10d2.

The connection mechanism 10d operates as follows. When the operation knob 12, assembled to the horizontal blade 11, is slid leftward or rightward, the operation knob 12 pushes the connection pillar portions 13c and 13d, inserted into the corresponding engagement grooves 12a1 and 12b1, leftward or rightward to thereby swing the vertical blade 13 leftward or rightward. During this operation, one of the connection pillar portions 13c and 13d, pushed by the center connection arm portion 12c, moves within the corresponding engagement groove toward the opening portion side. When the vertical blade 13 swings by a predetermined amount, one of the connection pillar portions 13c and 13d passes over the tip end of the center connection arm portion 12c and moves outside toward one of the connection arm portions 12a and 12b, while the other of the connection pillar portions 13c and 13d moves toward the base end portion of the corresponding engagement groove, and is pushed by the other of the outside connection arm portions 12a and 12b.

Incidentally, although the above-described structure of the first connection mechanism portion 10d1 of the connection mechanism 10d enables the first connection mechanism portion 10d1 to be molded integrally with the vertical blade group 10c between the stationary die half 10e1 and the movable die half 10e2 of the molding die 10e, with mutually facing portions of the stationary die half 10e1 and the movable die half 10e2 have having complicated shapes as indicated by the parting line PL. In this structure, since a plurality of narrow projections are present, a problem associated with the die strength may arise. Therefore, there is a demand for a structure of the connection mechanism 10d which simplifies the shape of the parting line PL to thereby improve the strength of the molding die 10e.

In the above-described connection mechanism 10d, while the blades of the vertical blade groups 10c are swung in an interlocked manner, one of the connection pillar portions 13c and 13d is pushed so that the first connection mechanism portion 10d1 is moved from the side of the center connection arm portion 12c, of the second connection mechanism portion 10d2, to one of the connection arm portions 12a and 12b. At that time, the load acting on the operation knob 12 changes suddenly. As a result, a person who operates the operation knob 12 feels a resistance during the operation, which impairs the operation feel. Therefore, the connection mechanism 10d is demanded to have a structure which can improve the operation feel of the operation knob 12.

Further, since the first connection mechanism portion 10d1 of the connection mechanism 10d has the above-described structure, a blade portion which functions as a vertical blade is not present between the upper and lower support plate portions 13a and 13b. Therefore, when the vertical blade group 10c is swung, a guide passage which causes air to flow straight is formed between the upper and lower support plate portions 13a and 13b, as indicated by alternate long and short dash lines in FIG. 8B. As a result, the connection mechanism 10d impairs the air-directing function of the register 10. Therefore, the connection mechanism 10d is demanded to have a structure which can improve the air-directing function.

SUMMARY OF THE INVENTION

Accordingly, an object of the present invention is to provide a vehicle-cabin air outlet device which employs a connection mechanism which can meet at least one of the above-described demands for the conventional connection mechanism.

The present invention is directed to an air outlet device for a vehicle cabin. The present invention is applicable to an air outlet device comprising a tubular body which forms an air guide passage; a plurality of front-side parallel wind-direction adjustment plates rotatably supported inside the tubular body at a front end thereof; a plurality of rear-side parallel wind-direction adjustment plates which are perpendicular to the front-side wind-direction adjustment plates and rotatably supported inside the tubular body at a position shifted rearward from the front end by a predetermined distance; and an operation knob which is assembled to a selected one of the front-side wind-direction adjustment plates to be slidable along a longitudinal direction thereof. The operation knob is operatively connected to a selected one of the rear-side wind-direction adjustment plates via a connection mechanism. The rear-side wind-direction adjustment plates are swung in a mutually interlocked manner when the operation knob is slid on the selected front-side wind-direction adjustment plate along the longitudinal direction.

In the air outlet device according to the present invention, the connection mechanism comprises a connection pillar portion formed integrally with an intermediate portion of the selected rear-side wind-direction adjustment plate, the connection pillar portion having a generally circular cross section and being located "coaxially" to the selected rear-side wind-direction adjustment plate (i.e. located in such a manner that the connection pillar overlaps the main portion of the selected rear-side wind-direction adjustment plate in a plan view); and a pair of connection arm portions extending rearward from a rear end of the operation knob with a predetermined space formed therebetween. The operation knob is connected to the selected rear-side wind-direction adjustment plate in a state where the connection pillar portion is rotatably inserted into an engagement groove between the connection arm portions.

In the air outlet device according to the present invention, the shape of the parting line PL between a stationary die half and a movable die half of a molding die can be simplified, and the stationary and movable die halves do not have a plurality of narrow projections, so that the strength of the molding die can be made higher than those of conventional molding dies.

The connection mechanism is configured such that the operation knob is connected to the selected rear-side wind-direction adjustment plate in a state where the single connection pillar portion provided on the selected rear-side wind-direction adjustment plate is inserted into the engagement groove between the two connection arm portions provided on the operation knob. Therefore, the connection pillar portion is located within the engagement groove between the connection arm portions while the operation knob is being slid on the front-side wind-direction adjustment plate so as to swing the rear-side wind-direction adjustment plates. Therefore, the load acting on the operation knob does not change suddenly during the sliding operation of the operation knob, and a person who operates the operation knob does not feel a resistance during the operation, so that the operation feel is not impaired.

The air outlet device according to the present invention may be configured as follows. The selected rear-side wind-direction adjustment plate is longitudinally divided into two adjustment plate portions. A pair of support plate portions are formed integrally with end portions of the adjustment plate portions such that the support plate portions face each other. A pair of connection plate portions are formed integrally with the support plate portions such that the connection plate portions extend between mutually facing side edge portions of the support plate portions so as to connect the support plate portions together. The connection pillar portion is formed integrally with the support plate portions and is located frontward of the connection plate portions. The connection pillar portion is also located around center of the support plate portions or between imaginary lines extending forward from the connection plate portions. These portions constitute a first connection mechanism portion. The operation knob is connected to the selected rear-side wind-direction adjustment plate in a state where the connection pillar portion of the first connection mechanism portion is rotatably inserted into the engagement groove between the connection arm portions, which constitute a second connection mechanism portion.

When the connection mechanism having the above-described structure is used, the connection plate portions complement the wind-direction adjusting function of the wind-direction adjustment plate portions. Therefore, even when the rear-side wind-direction adjustment plate group is swung, a guide passage which causes air to flow straight is not formed, and the air-directing function of the air outlet device is not impaired.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT INVENTION

Figure 1:
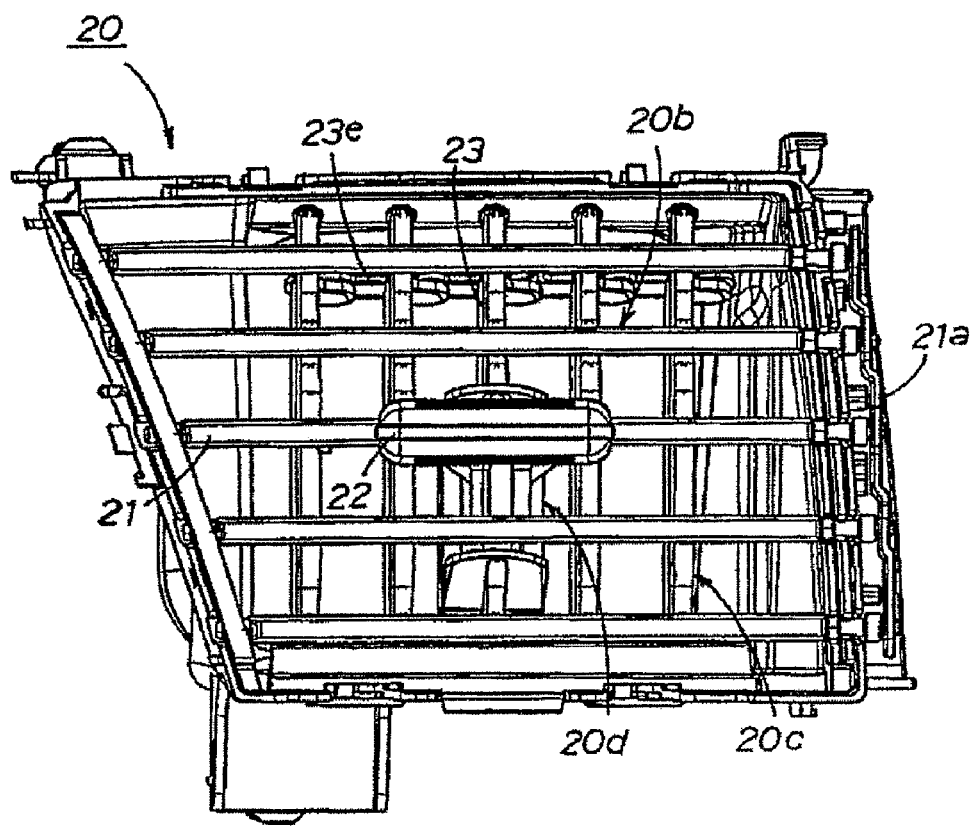
FIG. 1 is a front view of a register which is one embodiment of the vehicle-cabin air outlet device according to the present invention.
Figure 2:
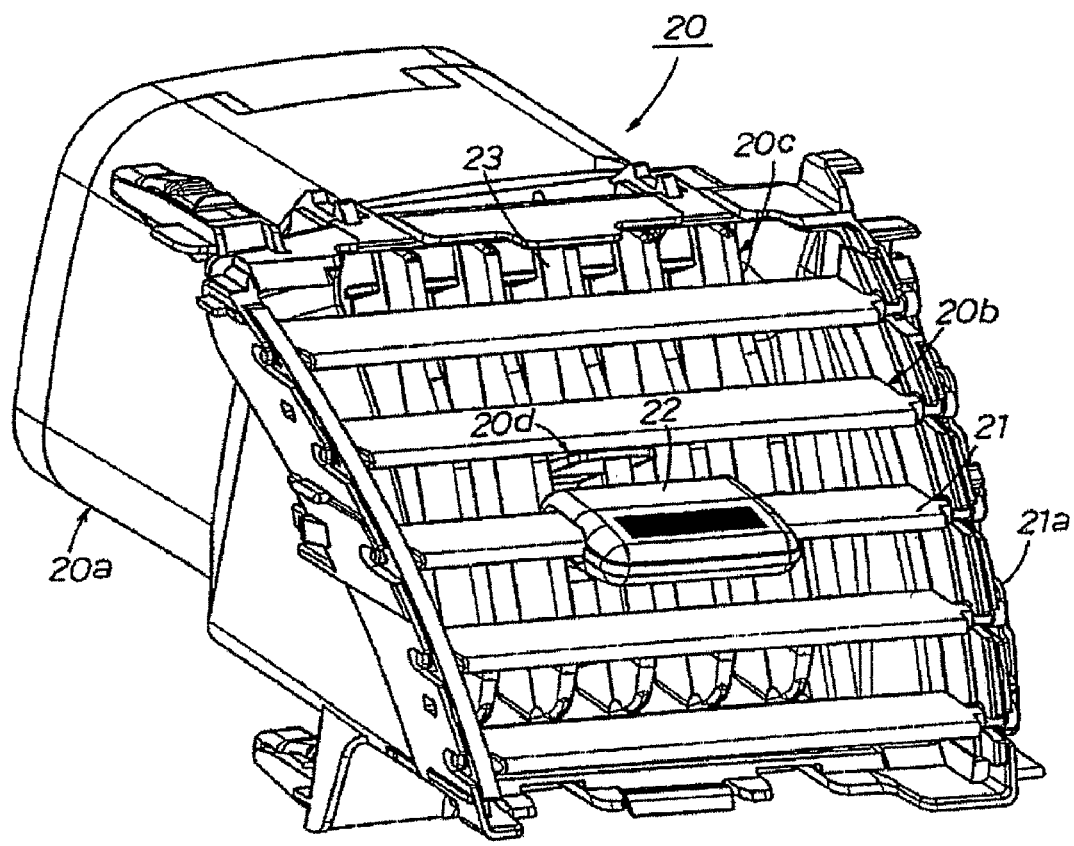
FIG. 2 is a perspective view of the register of FIG. 1.

The present invention relates to a vehicle-cabin air outlet device. FIGS. 1 to 4 show a register 20 which is one embodiment of the air outlet device according to the present invention. The register 20 is connected to an end of an air duct of an air conditioner disposed at the back of an instrument panel provided on the front side of a vehicle cabin, and is assembled to the instrument panel. In a state where the register 20 is assembled to the instrument panel, an air outlet opening portion of the register 20 faces the interior of the vehicle cabin.

The register 20 includes a retainer 20a, which is a rectangular tubular body for forming an air guide passage; a horizontal blade group 20b composed of a plurality of horizontal blades (wind-direction adjustment plates) which are arranged in parallel in the horizontal direction and rotatably supported inside the retainer 20a at a position near a front end opening thereof; a vertical blade group 20c composed of a plurality of vertical blades (wind-direction adjustment plates) which are arranged in parallel in the vertical direction and are rotatably supported inside the retainer 20a at a position shifted rearward from the horizontal blade group 20b by a predetermined distance; and a connection mechanism 20d for operationally connecting an operation knob to the vertical blades. These constituent members are all resin molded products formed of a synthetic resin material.

The vertical blades of the vertical blade group 20c, a connection rod 23e (which will be described later) for connecting the vertical blades together, and a support plate 23f (which will be described later) for rotatably supporting the vertical blades are molded in a molding die 20e schematically shown in FIG. 5A. The molding die 20e is configured to enable the vertical blades of the molded vertical blade group 20c to be assembled to the molded connection rod 23e and the molded support plate 23f within the molding die 20e. Notably, in FIG. 5A, reference numeral 20e1 denotes a stationary die half, reference numeral 20e2 denotes a movable die half, and reference character PL denotes a parting line at which the movable die half 20e2 can be separated from the stationary die half 20e1.

In the register 20, an operation knob 22 is assembled to a selected horizontal blade 21 located at a central portion in the horizontal blade group 20b. The operation knob 22 is assembled to the horizontal blade 21 to be slidable in the horizontal direction (the longitudinal direction). The connection mechanism 20d is formed between the operation knob 22 and a selected vertical blade 23 located at a central portion in the vertical blade group 20c. The connection mechanism 20d is composed of a first connection mechanism portion 20d1 provided on the vertical blade 23 and a second connection mechanism portion 20d2 provided on the operation knob 22 side.

Figure 3:
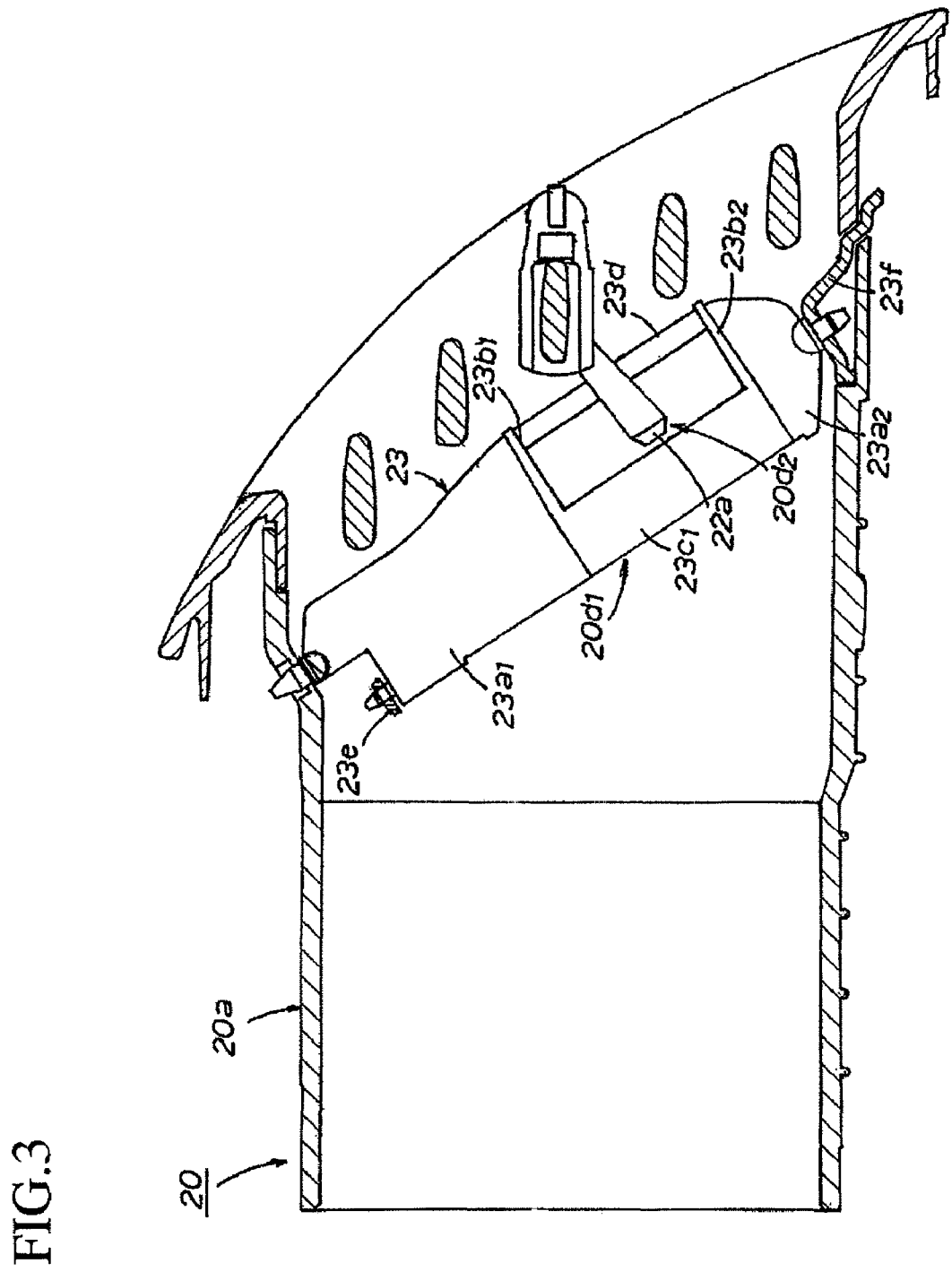
FIG. 3 is a vertically sectioned side view of the register of FIG. 1.
Figure 4:
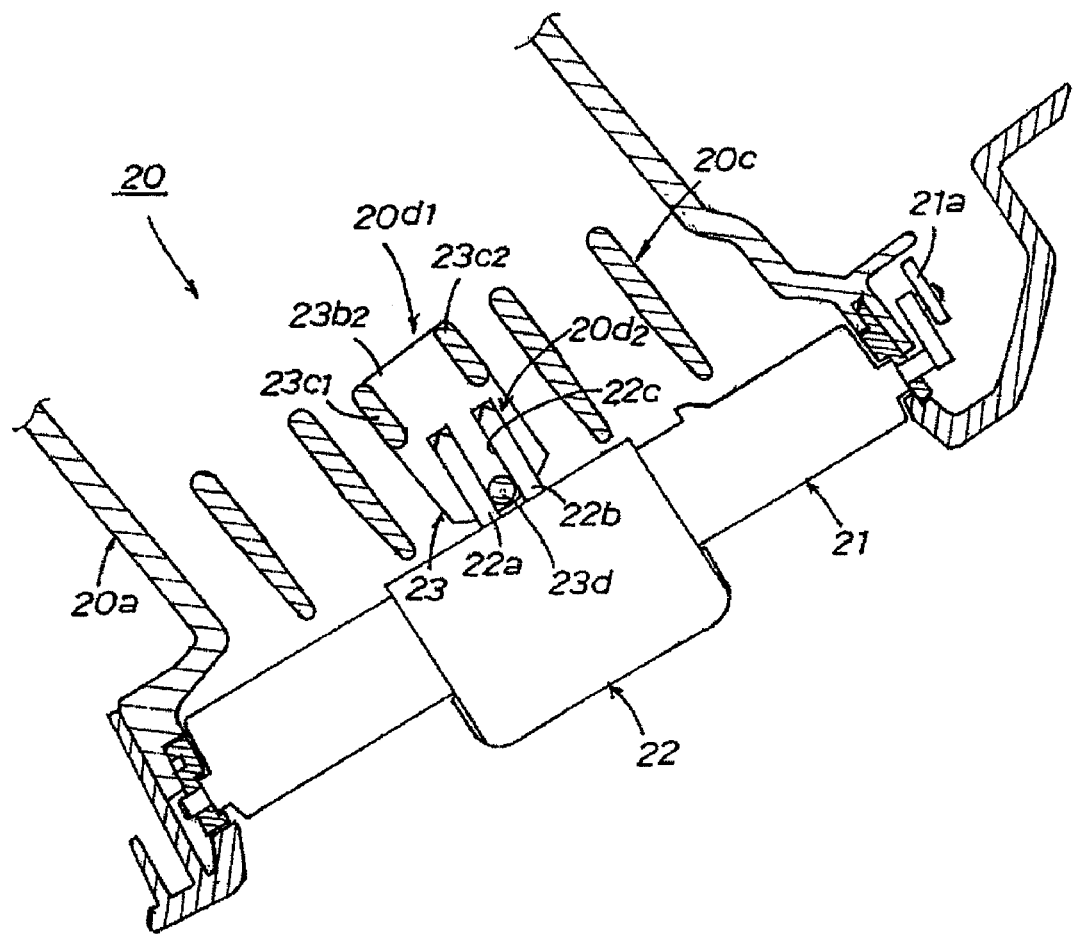
FIG. 4 is a horizontally sectioned plan view of the register of FIG. 1.

As shown in FIGS. 3 to 5, the vertical blade 23 is divided into upper and lower blade portions 23a1 and 23a2. Flat support plate portions 23b1 and 23b2 are integrally formed at mutually facing ends of the upper and lower blade portions 23a1 and 23a2. The first connection mechanism portion 20d1 includes these support plate portions 23b1 and 23b2; a pair of connection plate portions 23c1 and 23c2 molded integrally with the support plate portions 23b1 and 23b2 to extend between the mutually facing side edge portions of the support plate portions 23b1 and 23b2 and connecting together the support plate portions 23b1 and 23b2; and a connection pillar portion 23d having a circular cross section, located at a position which is almost center in width direction (direction along the arrangement of the vertical blades) and is front-end side of the support plate portions 23b1 and 23b2 (frontward of the connection plate portions 23c1 and 23c2), formed integrally with the support plate portions 23b1 and 23b2 to connect the support plate portions 23b1 and 23b2 together. Such a structure of the first connection mechanism portion 20d1 enables the movable die half 20e2 to be separated from the stationary die half 20e1 at the parting line PL, serving as a reference line. The vertical blade group 20c provided with the first connection mechanism portion 20d1 is assembled to the connection rod 23e and the support plate 23f so as to form an assembly structure, which is assembled into the retainer 20a.

Meanwhile, the second connection mechanism portion 20d2 is formed integrally with a rear portion of the operation knob 22, which is assembled to the horizontal blade 21 to be slidable in the horizontal direction. The second connection mechanism portion 20d2 includes left and right connection arm portions 22a and 22b provided at the rear portion of the operation knob 22. The operation knob 22 is operationally connected to the vertical blade 23 in a state where the connection pillar portion 23d of the first connection mechanism portion 20d1 is inserted into an engagement groove 22c between the connection arm portions 22a and 22b.

Figure 5A:
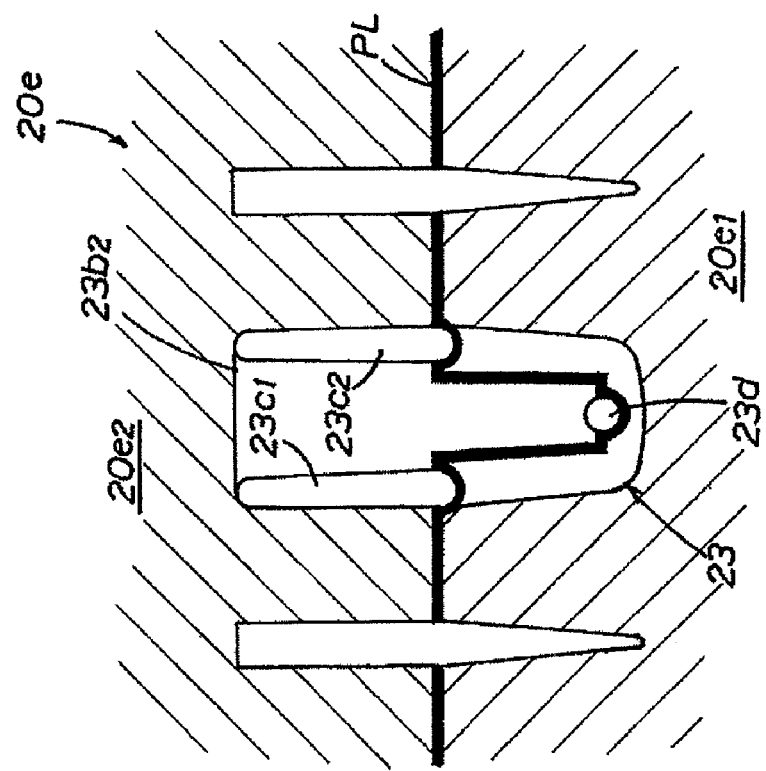
FIG. 5A is a schematic view showing a state where the vertical blade group of the register of FIG. 1 is molded within a molding die.

The vertical blade group 20c including the vertical blade 23, on which the first connection mechanism portion 20d1 of the connection mechanism 20d is provided, is molded between the stationary die half 20e1 and the movable die half 20e2 of the molding die 20e, as shown in FIG. 5A. After completion of molding, the movable die half 20e2 is separated from the stationary die half 20e1, and the vertical blade group 20c is released from the die. Within the molding die 20e, the released vertical blade group 20c is assembled to a predetermined portion within the retainer 20a by means of an unillustrated assembly jig provided in the molding die 20e, whereby the vertical blade group 20c is rotatably supported in the retainer 20a.

In the register 20 having the connection mechanism 20d configured as described above, when the flow of air discharged from the air outlet opening portion is to be directed upward (downward) through a swing motion of the horizontal blade group 20b located on the front side, the operation knob 22, which is assembled to the horizontal blade 21, is turned or rotated upward (downward). As a result, the horizontal blade 21 swings upward (downward), and simultaneously, all the horizontal blades (horizontal blade group 20b) connected to the horizontal blade 21 via a connection rod 21a also swing in the same direction in an interlocked manner, whereby the air discharged from the air outlet opening portion is directed to a direction to which the horizontal blade group 20b is swung.

When the flow of air discharged from the air outlet opening portion is to be directed leftward (rightward) through a swing motion of the vertical blade group 20c located on the rear side, the operation knob 22 is slid leftward (rightward) on the horizontal blade 21. As a result, the vertical blade 23 swings leftward (rightward), and simultaneously, all the vertical blades (vertical blade group 20c) connected to the vertical blade 23 via the connection rod 23e swing in the same direction in an interlocked manner, whereby the air discharged from the air outlet opening portion is directed toward a direction to which the vertical blade group 20c is swung.

Figure 8A:
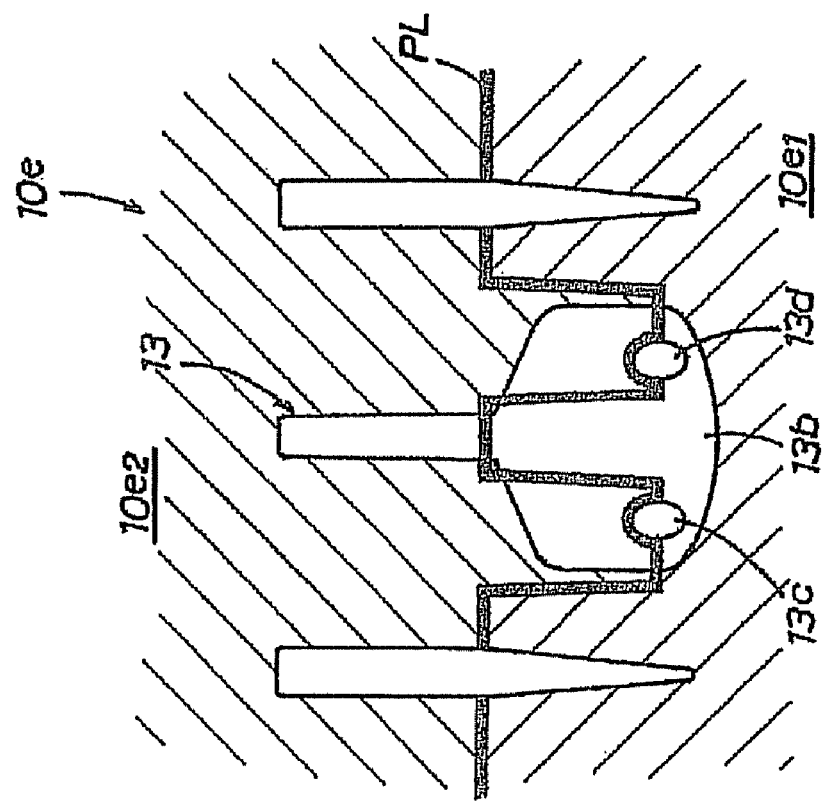
FIG. 8A is a schematic view showing a state where the vertical blade group of the register of FIG. 6 is molded within a molding die.
Figure 8B:
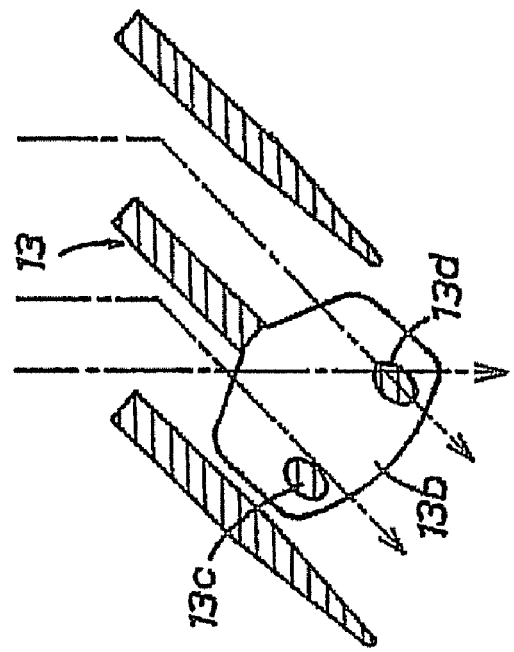
FIG. 8B is a schematic view showing the flow direction of air discharged from an air outlet opening portion when the vertical blade group is swung.

Incidentally, the above-described structure of the first connection mechanism portion 20d1 of the connection mechanism 20d provided in the register 20 enables the first connection mechanism portion 20d1 to be molded integrally with the vertical blade group 20c between the stationary die half 20e1 and the movable die half 20e2 of the molding die 20e. Since the mutually facing portions of the stationary die half 20e1 and the movable die half 20e2 have simple shapes as indicated by the parting line PL of FIG. 5A, a plurality of narrow projections are not present between the mold halves 20e1 and 20e2. Therefore, the molding die 20e is higher in strength than the conventional molding die 10e shown in FIG. 8A.

In the case of the connection mechanism 20d provided in the register 20, when the vertical blade group 20c is swung in an interlocked manner, the connection pillar portion 20d of the first connection mechanism portion 20d1 is always located within the engagement groove 22c between the connection arm portions 22a and 22b of the second connection mechanism portion 20d2. Therefore, the load acting on the operation knob 22 does not change suddenly during the sliding operation of the operation knob 22, and a person who operates the operation knob 22 does not feel a resistance during the sliding operation of the operation knob 22, so that the operation feel is not impaired.

Figure 5B:
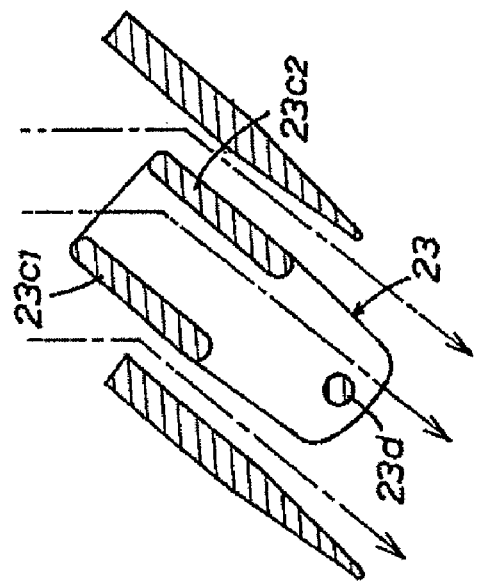
FIG. 5B is a schematic view showing the flow direction of air discharged from an air outlet opening portion when the vertical blade group is swung.
Figure 6:
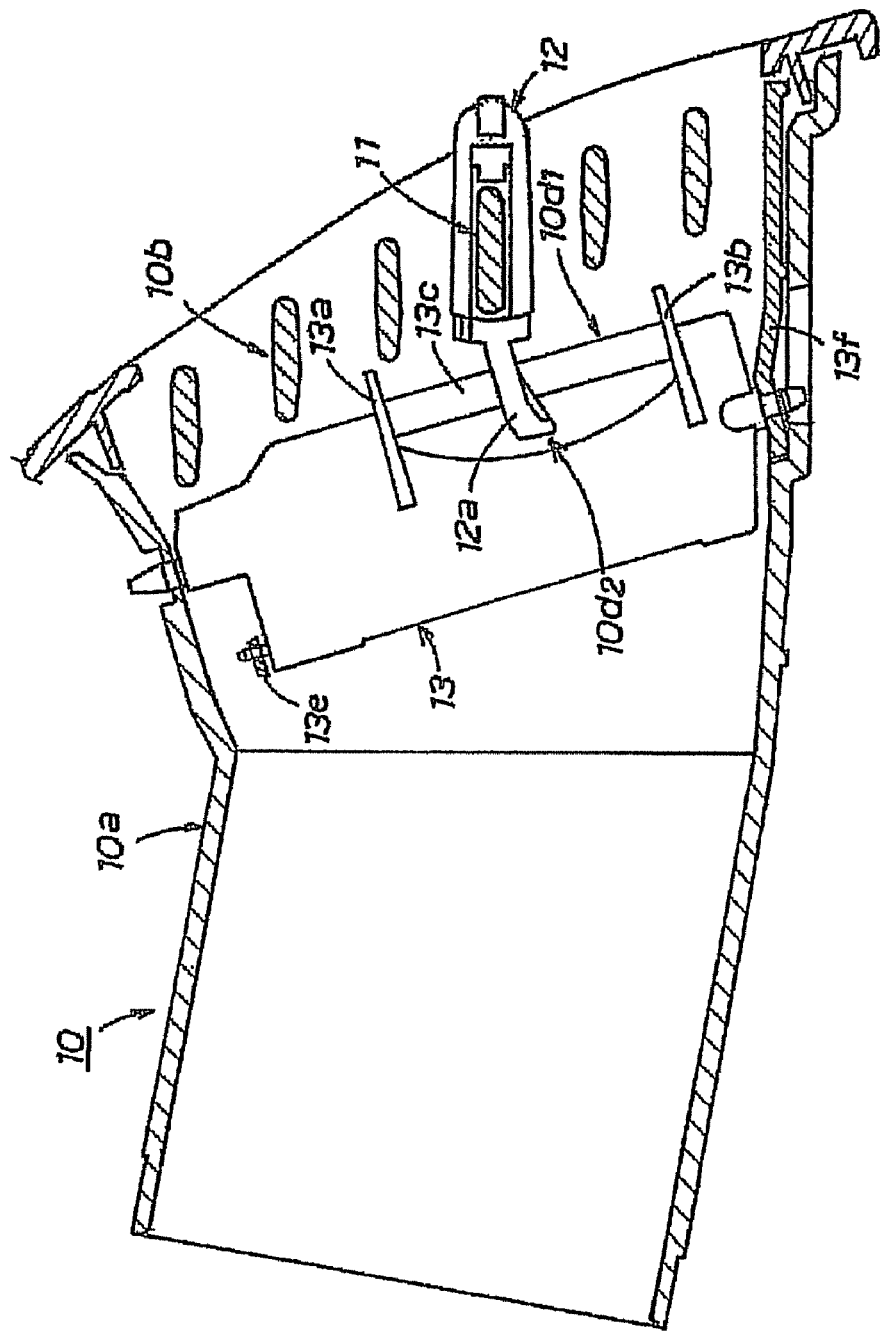
FIG. 6 is a vertically sectioned side view of a register which is a conventional vehicle-cabin air outlet device.
Figure 7:
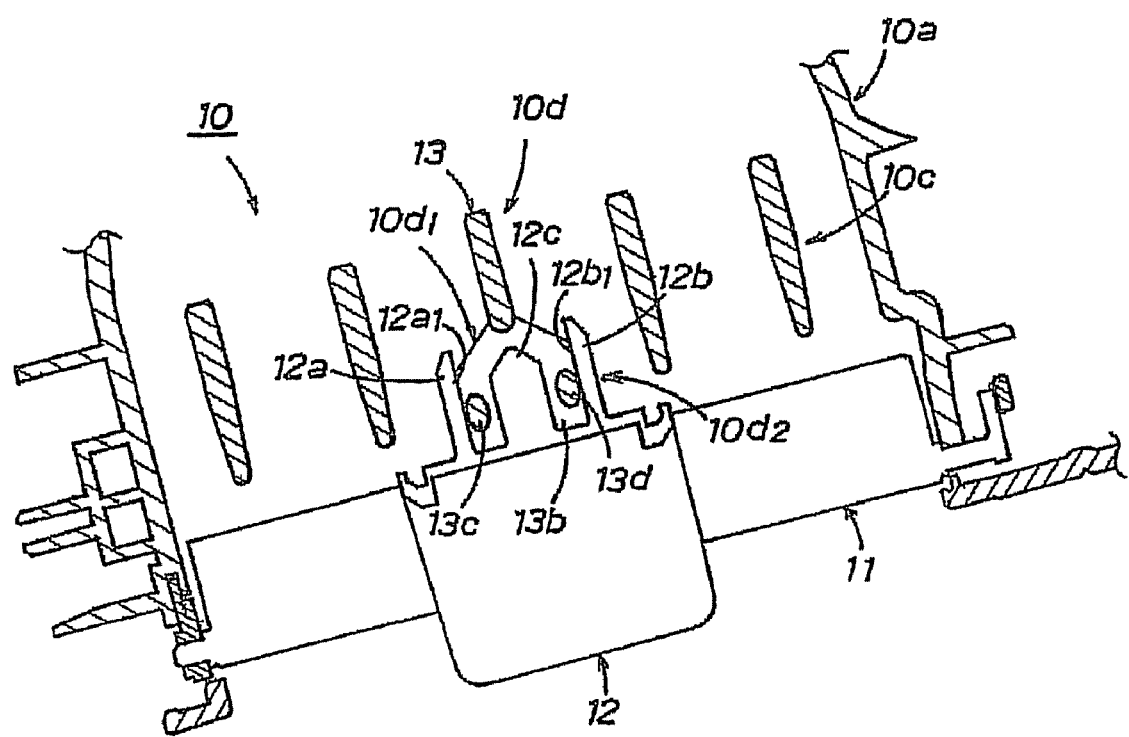
FIG. 7 is a horizontally sectioned plan view of the register of FIG. 6.

Further, since the first connection mechanism portion 20d1 of the connection mechanism 20d provided in the register 20 has the above-described structure, the connection plate portions 23c1 and 23c2 provided between the support plate portions 23b1 and 23b2 to extend between the mutually facing side edge portions thereof have an air direction adjustment function similar to that provided by the blade portions 23a1 and 23a2 of the vertical blade 23, as indicated by alternate long and short dash lines in FIG. 5B. Therefore, in the case of the first connection mechanism portion 20d1, even when the vertical blade group 20c is swung, a guide passage which causes air to flow straight is not formed, and the air-directing function of the register 20 is not impaired.

What is claimed is:
1. An air outlet device for a vehicle cabin, comprising:
a tubular body which forms an air guide passage;
a plurality of front-side parallel wind-direction adjustment plates rotatably supported inside the tubular body at a front end thereof;
a plurality of rear-side parallel wind-direction adjustment plates which are perpendicular to the front-side wind-direction adjustment plates and rotatably supported inside the tubular body at a position shifted rearward from the front end by a predetermined distance, wherein a selected rear-side wind-direction adjustment plate is comprised of a pair of adjustment plate portions that are formed so as to longitudinally divide the selected rear-side wind-direction adjustment plate;
a pair of support plate portions formed integrally with end portions of the adjustment plate portions and facing each other;
a pair of connection plate portions both formed integrally to a predetermined size and relative perpendicular position with the support plate portions and extending between mutually facing side edge portions of the support plate portions so as to connect the support plate portions together and which, in combination, function to direct air flow through the support plate portion;

a connection pillar portion, having a smooth circular cross section, located at a position which is frontward and center of the connection plate portions and an forward central portions of the support plate portions, and is formed integrally with the support plate portions to additionally connect the support plate portions together, wherein the connection pillar portion is substantially parallel to the connection plate portions; and an operation knob which is assembled to a selected one of the front-side wind-direction adjustment plates to be slidable along a longitudinal direction thereof, said operation knob also being operatively connected to said selected rear-side wind-direction adjustment plate via a connection mechanism, and the rear-side wind-direction adjustment plates are swung in a mutually interlocked manner when the operation knob is slid on the selected front-side wind-direction adjustment plate along the longitudinal direction, wherein the connection mechanism includes a first connection mechanism portion associated with the selected rear-side wind-direction adjustment plate and a second connection mechanism portion associated with the operation knob, the first connection mechanism portion including the support plate portions, the connection plate portions, and the connection pillar portion, the second connection mechanism portion including the connection arm portions extending rearward from the rear end of the operation knob, and wherein the operation knob is connected to the selected rear-side wind-direction adjustment plate in a state where the connection pillar portion of the first connection mechanism portion is rotatably inserted into the engagement groove between the connection arm portions of the second connection mechanism portion.

* * * * *